Jan. 25, 1944.                L. C. GOODALE                2,339,850
           METHOD OF FORMING AND ASSEMBLING VACUUM TUBE SUPPORTS
                    Filed June 8, 1940           3 Sheets-Sheet 1
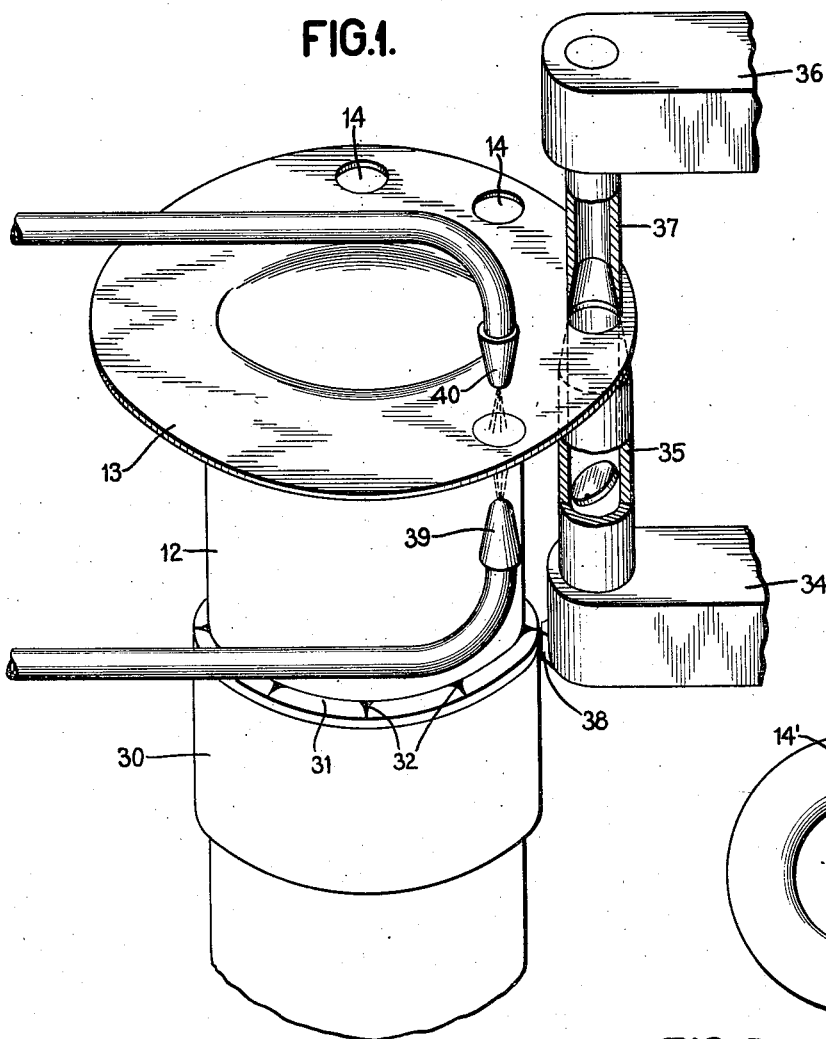
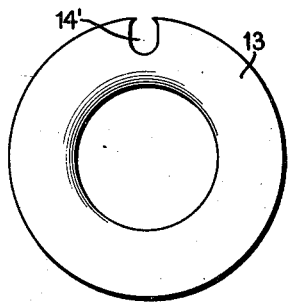
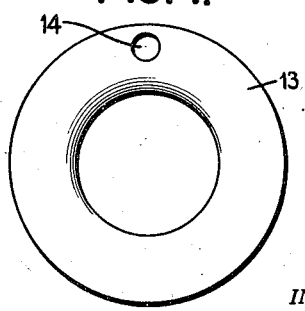
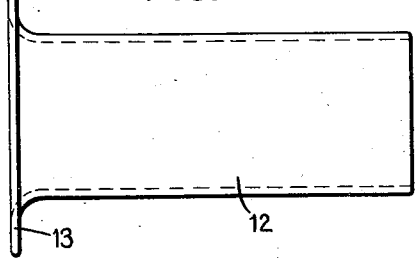
INVENTOR.
LYNN C. GOODALE
BY
R. C. Hopgood
ATTORNEY.

Jan. 25, 1944. L. C. GOODALE 2,339,850
METHOD OF FORMING AND ASSEMBLING VACUUM TUBE SUPPORTS
Filed June 8, 1940 3 Sheets-Sheet 2
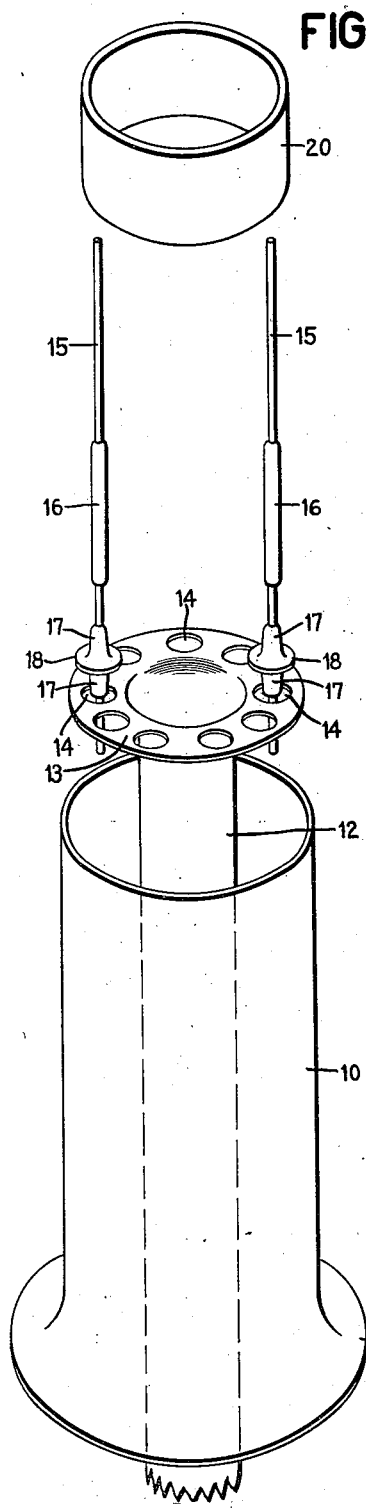
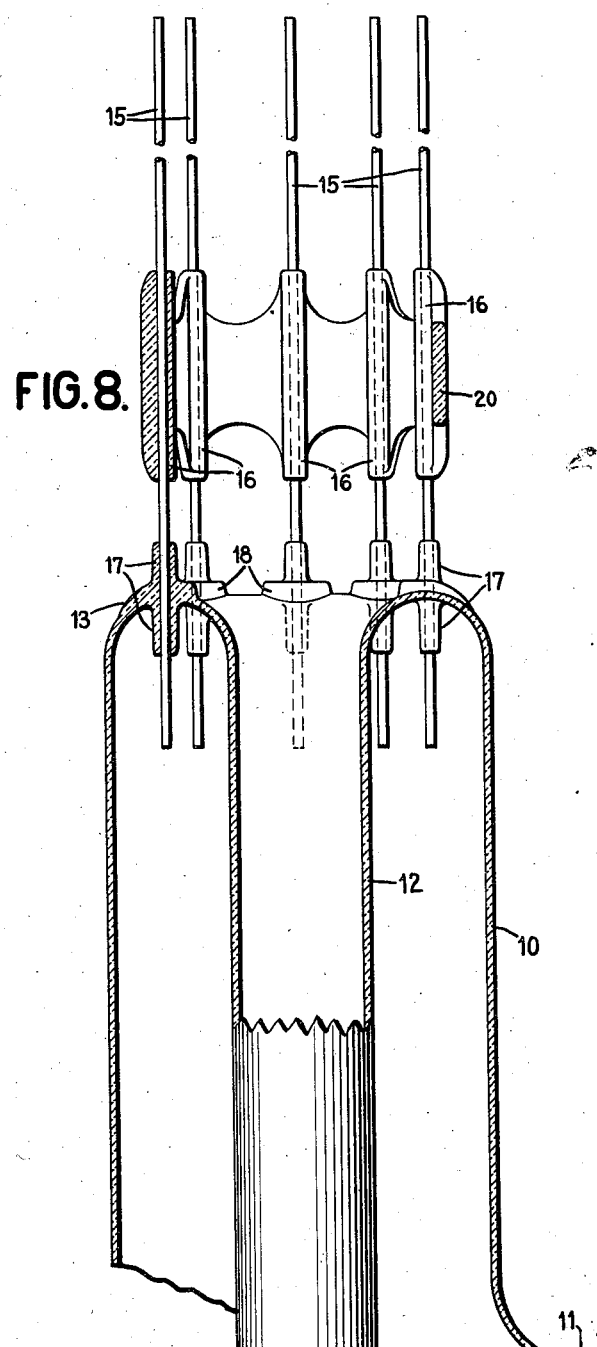
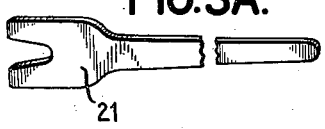
INVENTOR.
LYNN C. GOODALE
ATTORNEY.

Jan. 25, 1944.　　　L. C. GOODALE　　　2,339,850
METHOD OF FORMING AND ASSEMBLING VACUUM TUBE SUPPORTS
Filed June 8, 1940　　　3 Sheets-Sheet 3

INVENTOR.
LYNN C. GOODALE
R C Hopgood
ATTORNEY.

Patented Jan. 25, 1944

2,339,850

UNITED STATES PATENT OFFICE 2,339,850

METHOD OF FORMING AND ASSEMBLING VACUUM TUBE SUPPORTS

Lynn C. Goodale, Newark, N. J., assignor to Federal Telephone and Radio Corporation, a corporation of Delaware Application June 8, 1940, Serial No. 339,480

2 Claims. (Cl. 49—78)

This invention relates to a method of producing and assembling vacuum tube supporting structures and is in part a continuation of my co-pending application Ser. No. 244,412, filed December 7, 1938.

According to one feature of my invention I provide a novel method of punching a partially formed glass supporting stem to provide openings in which electrode supporting rods may be sealed.

According to a further feature of my invention I provide a method of assembling an electrode supporting stem for a vacuum tube vessel in which the partially formed stem is first provided with perforations by punching, the metallic supporting rods are provided with glass beading, the rods then being inserted in the perforations with the beading within or adjacent the perforations and the assembly is heated to seal these parts together.

According to a still further feature of my invention, a second glass beading is provided on the supporting rods at a spaced point with respect to the beading first named, and a glass truss or bracing ring is fused thereto to further strengthen the support.

In accordance with these features it is an object of my invention to provide a novel method of forming an electrode supporting stem and the parts thereof.

It is a further object of my invention to provide a novel method of assembling a supporting stem arrangement for vacuum tube electrodes.

Figure 6:
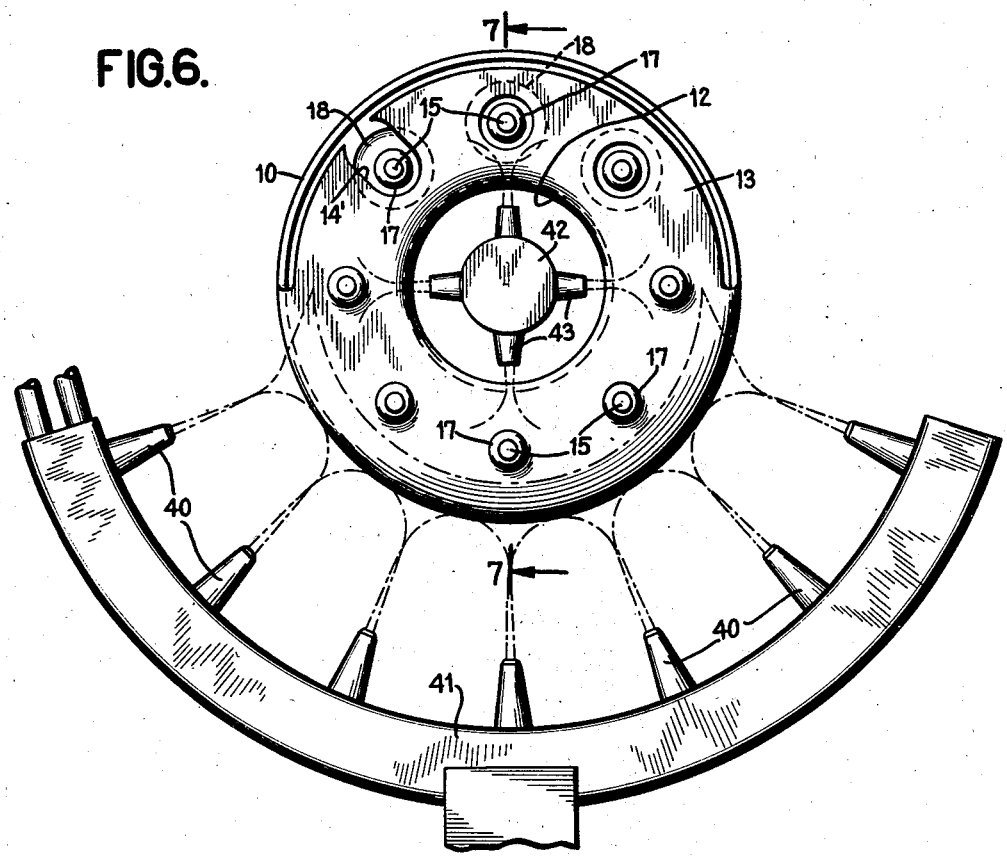
Figure 7:
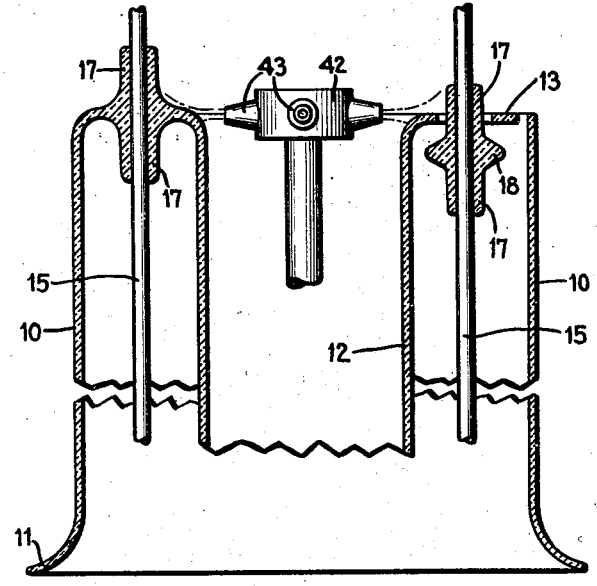

A better understanding of my invention as well as other features and objects thereof will be apparent from a particular description of a preferred embodiment thereof made in connection with the accompanying drawings, in which Fig. 1 illustrates the method used in punching holes in the glass stem portion, Figs. 2, 3 and 4 illustrate a longitudinal view and alternative plan views, respectively, of a particular punched stem portion, Fig. 5 illustrates an exploded view of the electrode stem parts before assembly, Fig. 5A shows a form of tool usable for shaping the beads, Figs. 6 and 7 illustrate the heating process for completing the sealing, Fig. 7 being a partial sectional view taken along the line 7—7 of Fig. 6, and Fig. 8 illustrates in cross-section the completed support assembly.

Turning first to Fig. 1, the apparatus for performing the method used for punching holes or openings in a glass flare is shown. In this arrangement a tube 12 with one end flared outwardly to produce a flange 13 is mounted on a supporting jig 30. The inner ring 31 of support 30 is rotatably mounted and carries with it tube 12. A plurality of markers 32 are provided at spaced intervals around ring 31 in order to indicate the position of flange 13 for the production of perforations or other openings therein. Immediately adjacent supporting jig 30 is provided a punch press having a lower stationary arm 34 carrying a lower cutter 35 and an upper movable arm 36 carrying a cutter 37. Fixed on stationary arm 34 is an indicator arrangement 38 which cooperates with indicators 32 for positioning the glass stem in the upper successive positions for punching. Cutters 37 and 35 are arranged so as to be normally placed above and below flange 13. Spaced from the cutters a distance equal to the interval between indicators 32 are provided upper and lower burners 39, 40, which project a needle flame against flange 13 so as to soften the glass locally around the area to be punched. After softening the glass the ring 30 is moved a distance of one space so that the softened glass area is positioned between the jaws 35, 37 of the punch press. At the same time the next succeeding point on the flange will be positioned under the flame to be softened for cutting out the next opening. Cutter 37 is then brought down against 35 and a small disc of glass is cut out of the flange providing opening 14. This operation is repeated until the entire series of holes about the flange are cut. By using this method the holes are expeditiously provided in the glass appliance 13 without requiring a softening of the entire area.

It is clear, however, that if it is desired a plurality of points may be locally heated and a plurality of holes punched simultaneously on the entire flange may be softened and all the holes punched simultaneously.

By punching out the material in the manner above described the holes may readily be provided at properly spaced intervals and of uniform size so as to facilitate complete assembly of the tube.

In Fig. 2 a longitudinal view of flanged tube 12 is shown. Fig. 3 illustrates an alternative arrangement wherein a notch 14' is punched out of the rim instead of a hole 14. Fig. 4 illustrates in plan view the flange 13 of Fig. 2 with a hole 14 punched therein.

In Fig. 5 is shown an exploded view illustrating the various elements for constructing an electrode supporting stem in accordance with my invention. In this figure is shown an outer cylindrical stem portion 10 preferably provided at its lower end with a flange 11 which is adapted to connect with other portions of the tube envelope. Tube 12 with flange 13 and holes 14, is illustrated similar to the arrangement shown in Fig. 1 of the drawings. Cylinder 10, upon complete assembly is sealed to the outer edge of flange 13. Preferably a plurality of holes 14 are provided so as to provide apertures in the form of a circle. It is clear, however, that instead of holes 14 as shown, other forms of apertures such as notches 14' of Fig. 3 may be provided.

Electrode supporting rods 15 are made of any suitable metal such as tungsten or molybdenum and are fused through the glass to form a substantially vacuum tight seal. A plurality of rods 15 equal in number to the number of openings 14 in flange 13 are provided. On each of rods 15 is provided a beading 17 which may be formed by fitting over the rod a length of glass tubing so that it will fuse to the rod in the form of an elongated bead. These beadings 17 may be formed as follows:

The inner or small diameter portion of the bead may be formed from glass tubing as described above. The larger or protruding portion of bead 17 designated by numeral 18 may be formed by wrapping around the small diameter portion of the bead lengths of cane glass to produce the desired size extension. This rod may be then wiped with a graphite paddle such as shown at 21 in Fig. 5A provided with an opening to conform to the desired shape of the flange 18. I prefer to use a graphite paddle provided with a V notch so that the bead will be thinner at its outer edge than at the center as illustrated in Fig. 5A.

If desired in order to provide a more rigid supporting structure additional beads 16 may be formed on rod 15 at a point spaced from bead 17. A glass ring 20 of suitable size to contact the outer surfaces of beads 16 when applied outside of the assembly, may be provided which may be then sealed to beads 16 to produce an additional spacing of the structure.

A more complete understanding of the method utilized in sealing beads 18 with flange 13 and the stem portion 10 also with flange 13 may be had by reference to Figs. 6 and 7. In Fig. 6 the stem portion provided with the punched openings in flange 13 is shown in plan view and around this flange is shown the upper edge of tube 10. A heating of the outer edge of the flange and upper end of tube 10 is achieved by means of a plurality of burners 40 arranged on a common burner rack 41 and supplied over suitable feed lines. These burners are preferably arranged in arcuate relationship so that they will be equally spaced from the tube support element as assembled. A centrally supported burner arrangement 42 supporting a plurality of burners 43 is provided centrally of tube 12.

In Fig. 7 the relationship of the central burner with respect to the assembled elements may be more readily perceived. In this figure the tube envelope is shown in section so as to more clearly illustrate a preferred manner of assembling the elements. In the upper portion of Fig. 7 it can be seen that rod 15 is passed through aperture 14 so that the bead portion thereof is adjacent to the aperture. As thus supported the flames from burners 43 serve to quite thoroughly heat the portion of the flange adjacent the beads 18 so as to soften the glass to form the seal. Burner rack 41 and burners 40 have been omitted for the sake of clearness. It is understood, however, that these burners 40 are adjusted to furnish heat primarily to the upper edge of their cylindrical element 10 and the outer edge of flange 13. The left-hand portion of Fig. 7 illustrates the completed tube portion after sealing together of the elements is completed.

While in Fig. 7 the rods 15 are shown with the flange 18 of bead 17 on the side toward which the tube 12 extends, it is clear that if desired they may be supported above this flange in the manner shown in Fig. 5.

The sealing of ring 20 to beads 16 may be accomplished simultaneously with the sealing of rods 15 to flange 13 or subsequent thereto. This sealing may be accomplished by means of a central burner such as burners 43 and a plurality of outer burners such as shown at 40 in Figs. 6 and 7.

An example of the electrode supporting structure completely assembled may be seen in Fig. 8, which shows such an assembly partly in section. In this figure a symmetrical arrangement of rods is provided so that they define a circle.

It is clear that the supporting rods 15 need not all be straight rods as shown but may be offset to provide various types of supporting arrangements. Furthermore the tubes 10, 12, and ring 13, need not be made circular but may be made any other desired configuration. It is understood, however, that the circular form is preferable since it is generally much easier to produce. Also, other suitable vitreous material than glass may be used.

It should be distinctly understood that the description of my invention made in connection with the accompanying drawings is merely by way of illustration of a preferred embodiment thereof and is not to be considered as a limitation on the scope of my invention. What I consider to be my invention and upon which I desire to obtain protection is embodied in the accompanying claims.

What I claim is:

1. A method of fabricating a vacuum tube electrode support having a glass flange provided with openings through which electrode supporting rods are sealed and a glass cylindrical body integral with a margin of the flange, which comprises forming a glass bead on each of said rods intermediate its ends, assembling said rods within the openings with each glass bead adjacent the margin of the contiguous opening and positioning the cylindrical body with its upper margin contiguous to the connecting margin of the flange, and heating said flange, beads and cylinder margin simultaneously to seal the rods in said openings and to seal the flange margin to the cylinder.

2. A method as set forth in claim 1, wherein the heat for sealing the beads to the flange is applied by a source of heat located centrally within the flange and the heat for joining the flange to the cylinder is applied by a source of heat arranged externally around the flange and cylinder.

LYNN C. GOODALE.